Patented Oct. 26, 1954

2,692,884

UNITED STATES PATENT OFFICE 2,692,884

ORGANIC SULFUR COMPOUNDS

Arthur H. Schlesinger, Dayton, Ohio, assignor to Monsanto Chemical Company, St. Louis, Mo., a corporation of Delaware No Drawing. Application September 26, 1951, Serial No. 248,467

3 Claims. (Cl. 260—330.5)

The present invention relates to heterocyclic organic compounds of sulfur and more particularly provides a series of the hitherto unknown (alkoxymethyl) thianaphthenes and methods of producing the same.

According to the invention there are provided 3-(alkoxymethyl) thianaphthenes having the formula

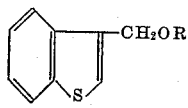

in which R is an alkyl radical of from 1 to 5 carbon atoms. Examples of compounds having the above formula are 3-(methoxymethyl) thianaphthene, 3-(ethoxymethyl) thianaphthene, 3-(isopropoxymethyl) thianaphthene, 3 - (n - butoxymethyl) thianaphthene, 3-(amyloxymethyl) - thianaphthene, etc.

The present 3-(alkoxymethyl) thianaphthenes are readily obtained by contacting 3-(bromomethyl) thianaphthene or 3-(chloromethyl) thianaphthene with a saturated, unsubstituted, aliphatic alcohol of from 1 to 5 carbon atoms in the presence of an inorganic basically reacting catalyst and allowing the resulting reaction mixture to stand at ordinary or increased temperature until formation of the 3-(alkoxymethyl) - thianaphthene has occurred. Advantageously the 3-(halomethyl) thianaphthene compound is added to a heated mixture of the alcohol and the basic catalyst, and the whole is then allowed to stand at temperatures of from, say, 50° C. to the refluxing temperature of the reaction mixture for a time of, say, a few minutes to several hours.

Alcohols which may be employed with the 3-(halomethyl)-thianaphthene compound to yield the present 3-(alkoxymethyl) thianaphthenes include methanol, ethanol, isopropanol, n-butanol, n-amyl alcohol, etc. As inorganic basic catalysts there may be used alkali metal hydroxides, i. e., sodium, potassium or lithium hydroxide or the basically reacting salts thereof such as potassium cyanide, sodium carbonate, lithium carbonate, etc.

The present 3-(alkoxymethyl) thianaphthenes are stable compounds which range from clear, viscous liquids to waxy or crystalline solids. They may be used for a variety of industrial purposes, e. g., as lubricant additives and as rubber vulcanization accelerators. They are particularly valuable as intermediates for the preparation of the herbicidally active 3-(alkoxymethyl) thianaphthene-1,1-dioxides, which compounds form the subject of my copending application Serial No. 248,464, filed of even date.

The present invention is further illustrated, but not limited, by the following example:

Example

To a refluxing suspension of 70 g. (1.08 mole) of potassium cyanide in 1.5 liters of methanol there was added 166 g. (0.91 mole) of 3-(chloromethyl) thianaphthene. After 30 minutes the potassium chloride which had formed was removed by filtration, water was added to the filtrate and the oil separated. A benzene extract of the aqueous phase was combined with the oil and the solution was dried over sodium sulfate. There was thus obtained 111 g. (68.5% theoretical yield) of the substantially pure 3-(methoxymethyl) thianaphthene, B. P. 118–120° C. at 4 mm., $n_D^{25}$ 1.6120.

Instead of employing methanol as the alcohol constituent in the above example, other aliphatic, saturated, unsubstituted alcohols of from 1 to 5 carbon atoms, e. g., ethanol or butanol may be used to yield the correspondingly alkoxymethylated thianaphthenes, e. g., 3-(ethoxymethyl)- thianaphthene or 3-(butoxymethyl) thianaphthene. Inorganic alkalis other than the potassium cyanide used above may be employed. The satisfactory use of potassium cyanide as the alkaline agent is surprising in that chloromethylated compounds generally react with potassium cyanide with replacement of the chlorine by the cyano group.

What I claim is:

1. Compounds having the formula

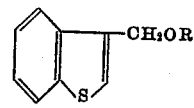

in which R is an alkyl radical of from 1 to 5 carbon atoms.

2. 3-(methoxymethyl) thianaphthene.

3. The method which comprises contacting 3-(chloromethyl) thianaphthene with methanol in the presence of potassium cyanide and recovering 3-(methoxymethyl) thianaphthene from the resulting reaction product.

References Cited in the file of this patent

UNITED STATES PATENTS

| Number | Name | Date |
|---|---|---|
| 2,533,086 | Blicke | Dec. 5, 1950 |

OTHER REFERENCES

Richter, "Textbook of Organic Chemistry," 2nd ed., Wiley and Sons, Inc., 1943, p. 89.